United States Patent
Özcan et al.

(10) Patent No.: US 12,276,640 B2
(45) Date of Patent: Apr. 15, 2025

(54) BEND TEST APPARATUS FOR A HYDRAULIC HOSE

(71) Applicant: Danfoss Power Solutions II Technology A/S, Nordborg (DK)

(72) Inventors: Gökhan Özcan, Çerkezköy (TR); Mustafa Ercan Ergur, Çerkezköy (TR); Temel Ozturk, Istanbul (TR); Mithat Ivrindilioglu, Saray (TR); Serdar Dursun, Saray Tekýrda (TR)

(73) Assignee: Danfoss Power Solutions II Technology A/S, Noraborg (DK)

( * ) Notice: Subject to any disclaimer, the term of this patent is extended or adjusted under 35 U.S.C. 154(b) by 225 days.

(21) Appl. No.: 17/640,562

(22) PCT Filed: Sep. 3, 2020

(86) PCT No.: PCT/EP2020/074665
§ 371 (c)(1),
(2) Date: Mar. 4, 2022

(87) PCT Pub. No.: WO2021/043937
PCT Pub. Date: Mar. 11, 2021

(65) Prior Publication Data
US 2022/0341828 A1    Oct. 27, 2022

(30) Foreign Application Priority Data

Sep. 4, 2019 (GB) .................... 1912704

(51) Int. Cl.
*G01N 3/20* (2006.01)
*G01M 5/00* (2006.01)

(52) U.S. Cl.
CPC ............ *G01N 3/20* (2013.01); *G01M 5/0058* (2013.01); *G01M 5/0025* (2013.01);
(Continued)

(58) Field of Classification Search
CPC ..... G01N 2203/028; G01N 2203/0032; G01N 2203/0023; G01N 3/20; G01M 5/0058; G01M 5/0025
(Continued)

(56) References Cited

U.S. PATENT DOCUMENTS

2002/0059834 A1 * 5/2002 Onoue .................... G01N 3/32
73/812

FOREIGN PATENT DOCUMENTS

| CN | 201561902 U | * | 10/2010 |
| CN | 202693429 U | * | 1/2013 |

(Continued)

OTHER PUBLICATIONS

Translation_CN112666006 (Year: 2021).*
(Continued)

*Primary Examiner* — Peter J Macchiarolo
*Assistant Examiner* — Monica S Young
(74) *Attorney, Agent, or Firm* — Merchant & Gould P.C.

(57) ABSTRACT

Bend test apparatus (100) for a hydraulic hose (200), the apparatus (100) comprising a main rack (10), at least one sliding rail (11) extending in a longitudinal direction (L) and a carriage (13) which is slidable on the sliding rail (11) in the longitudinal direction (L) and which can be displaced by an actuator (20), wherein the apparatus (100) further comprises a first fixture (1) that is rigidly attached to the main rack (10) to retain a first end (201) of the hydraulic hose (200) and a second fixture (2) that is rigidly attached to the carriage (13) to retain a second end (201) of the hydraulic hose (200), and wherein the apparatus (100) comprises a load cell (30) that is attached between the carriage (13) and the actuator (20) so as to detect a force (F) which is applied via the actuator (20) onto the carriage (13) and thereby onto the hydraulic hose (200) in the longitudinal direction (L).

9 Claims, 1 Drawing Sheet

(52) U.S. Cl.
CPC .............. *G01N 2203/0023* (2013.01); *G01N 2203/0028* (2013.01); *G01N 2203/0032* (2013.01)

(58) Field of Classification Search
USPC .......................................................... 73/791
See application file for complete search history.

(56) References Cited

FOREIGN PATENT DOCUMENTS

| CN | 205228943 | U | * | 5/2016 | |
| --- | --- | --- | --- | --- | --- |
| CN | 106483015 | | | 3/2017 | |
| CN | 107505212 | A | * | 12/2017 | |
| CN | 108072500 | | | 5/2018 | |
| CN | 207568956 | U | * | 7/2018 | |
| CN | 207779821 | U | | 8/2018 | |
| CN | 109100222 | A | * | 12/2018 | |
| CN | 109506861 | A | * | 3/2019 | |
| CN | 209432389 | | | 9/2019 | |
| CN | 20200097159 | A | * | 8/2020 | |
| CN | 112461653 | A | * | 3/2021 | |
| CN | 112666006 | A | * | 4/2021 | |
| CN | 113203620 | A | * | 8/2021 | ............... G01N 3/02 |
| JP | 2001074626 | A | * | 3/2001 | |
| KR | 100413063 | B1 | * | 8/2001 | |
| KR | 101770756 | | | 6/2017 | |
| WO | WO-2015141232 | A1 | * | 9/2015 | ............... G01N 3/20 |
| WO | WO-2020059303 | A1 | * | 3/2020 | ............ G01N 3/066 |

OTHER PUBLICATIONS

Translation_107505212 (Year: 2017).*
Translation_CN109100222 (Year: 2018).*
Translation_CN109506861 (Year: 2019).*
Translation_KR20200097159 (Year: 2020).*
Translation KR-100413063 Aug. 4, 2001 (Year: 2001).*
International Search Report and Written Opinion of the International Searching Authority for International Patent Application No. PCT/EP2020/074665 mailed Nov. 20, 2020, 11 pages.
International Search Report of Great Britain for the International Patent Application GB1912704.2 dated Jan. 23, 2020, 2 pages.

* cited by examiner

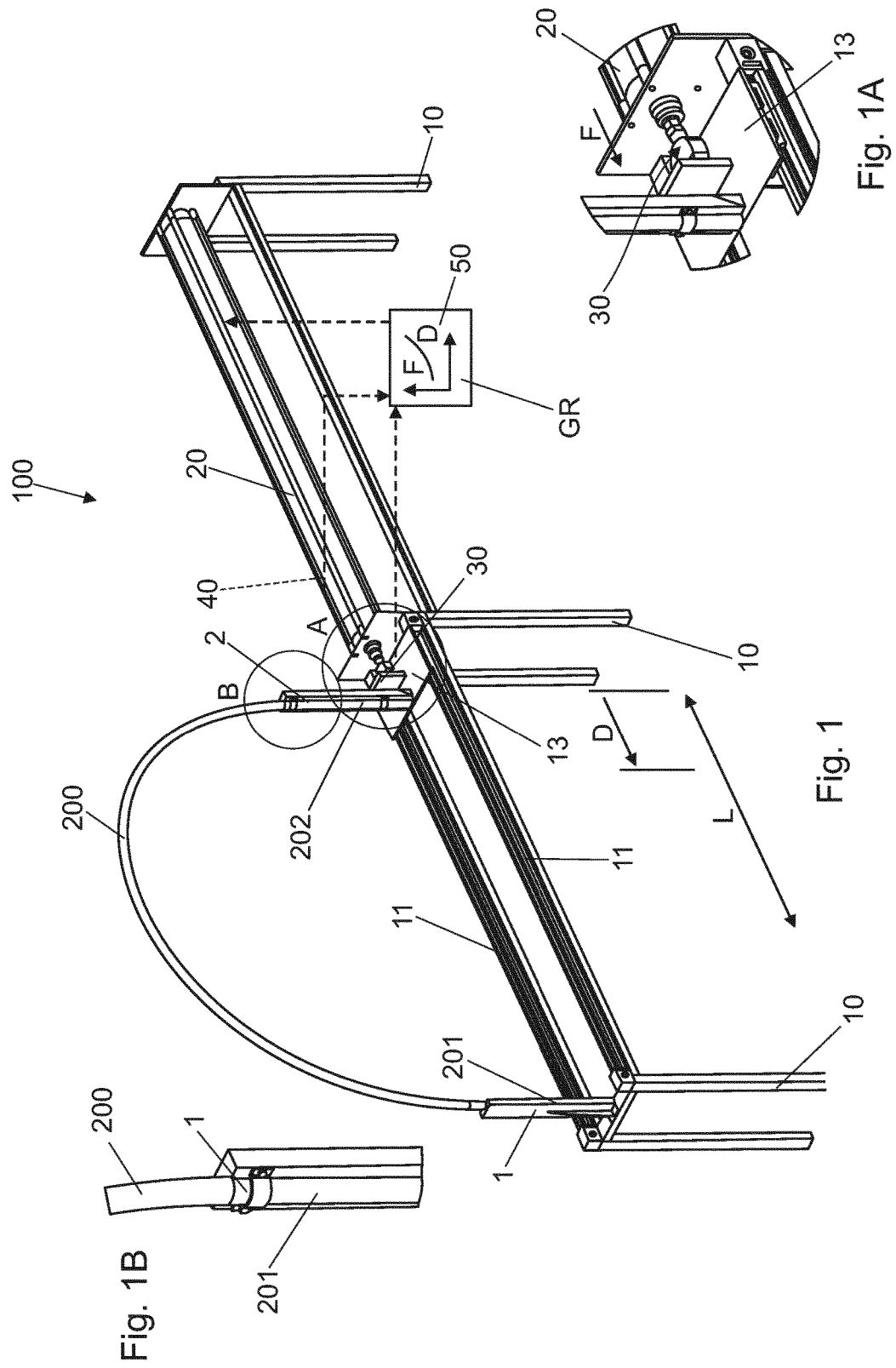

BEND TEST APPARATUS FOR A HYDRAULIC HOSE

This application is a National Stage Application of PCT/EP/2020/074665, filed 3 Sep. 2020, which claims benefit of Serial No. 1912704.2, filed 4 Sep. 2019 in the United Kingdom, and which applications are incorporated herein by reference. To the extent appropriate, a claim of priority is made to each of the above-disclosed applications.

The invention is directed to a bend test apparatus for a hydraulic hose, preferably a multilayer reinforced hydraulic hose.

Bend test apparatuses are generally known from the prior art.

It is a technical object of the invention to provide a bend test apparatus which provides the basis for quantified and precise measurements.

The object is achieved by a bend test Bend test apparatus for a hydraulic hose, the apparatus comprising a main rack, at least one sliding rail extending in a longitudinal direction and a carriage which is slidable on the sliding rail in the longitudinal direction and which can be displaced by an actuator. The apparatus further comprises a first fixture that is rigidly attached to the main rack to retain a first end of the hydraulic hose and a second fixture that is rigidly attached to the carriage to retain a second end of the hydraulic hose. The apparatus also comprises a load cell that is attached between the carriage and the actuator so as to detect a force which is applied via the actuator onto the carriage and thereby onto the hydraulic hose in the longitudinal direction.

The bend test apparatus according to the invention enables quantified and precise measurements of certain amount of force required to bend, deform or deflect a multilayer reinforced hydraulic hose.

Therefore, the invention is expected to help develop market leader products in terms of flexibility rating. The apparatus provides the basis for creating force applied vs deflection graphs and enables application of required force or deflection at any specified input hence providing substantial competitive advantage.

In a preferred embodiment the bend test apparatus comprises a displacement sensor that is arranged to measure a displacement of the carriage along the sliding rail in the longitudinal direction.

Advantageously the bend test apparatus comprises a controller adapted to process the force detected by the load cell. Additionally or alternatively the controller can be adapted to process the displacement measured by the displacement sensor.

In a further preferred embodiment the controller is further adapted to control the actuator.

Advantageously the controller is further adapted to iteratively record a dataset comprising at least the instantaneous displacement and the corresponding instantaneous force, preferably as a basis for a force vs displacement diagram.

The test apparatus can comprise a buckling detection system. Preferably the apparatus is arranged to stop a bending procedure if buckling of a hose is detected.

In a further embodiment the actuator is a linear servo motor. Alternatively or additionally the sliding rail and the carriage are part of a pulley-belt system that is actuated by the actuator. The actuator can be provided in form of an hydraulic and/or a servo actuator. Preferably the actuator comprises a hydraulic cylinder for actuation.

In the following, embodiments of the invention will be described with reference to drawings.

FIG. 1 shows a bend test apparatus 100 for a hydraulic hose 200. The apparatus 100 comprises a main rack 10, two parallel sliding rails 11 extending in a longitudinal direction L and a carriage 13 which is slidable on the sliding rails 11 in the longitudinal direction L.

The carriage 13 can be displaced by an actuator 20, which is provided as a linear servo motor.

The apparatus 100 further comprises a first fixture 1 that is rigidly attached to the main rack 10 to retain a first end 201 of the hydraulic hose 200. The first fixture 1 includes a clamp for clamping the first end 201 of the hydraulic hose 200 rigidly to the main rack 10 (see detail in FIG. 1B). The apparatus 100 also comprises a second fixture 2 that is rigidly attached to the carriage 13 to retain a second end 202 of the hydraulic hose 200. The second fixture 2 includes a clamp for clamping the second end 202 of the hydraulic hose 200 rigidly to carriage 13. By displacing the carriage 13—and thereby second fixture 2—the towards first fixture 1 in the longitudinal direction L the hydraulic hose 200 is increasingly bent.

Furthermore the apparatus 100 comprises a load cell 30 that is attached between the carriage 13 and the actuator 20 so as to detect a force F which is applied via the actuator 20 onto the carriage 13 and thereby onto the hydraulic hose 200 in the longitudinal direction L. The arrangement of the load cell can be seen in more detail in FIG. 1A.

As can be seen from FIG. 1 the bend test apparatus 100 also comprises a displacement sensor 40 that is arranged to measure a displacement D of the carriage 13 along the sliding rail 11 in the longitudinal direction L. The displacement sensor 40 is integrated in the actuator 20. Alternatively, for example if the sliding rail 11 and the carriage 13 are part of a pulley-belt system (not shown) displacement sensor can be integrated in the pulley-belt system.

Also, the apparatus 100 comprises a controller 50 adapted to process the force F detected by the load cell 30 and the displacement D measured by the displacement sensor. Furthermore, the controller 50 is adapted to control the actuator 20. Specifically, the controller 50 is capable adapted to iteratively record a dataset comprising the instantaneous displacement D and the corresponding instantaneous force F as a basis for a force F vs displacement D diagram GR.

In the following an exemplary procedure for operating the apparatus 100 of FIG. 1.

A hydraulic hose 200 to be tested is prepared at the length of [Pi*(half bend radius)+800 mm]. The hydraulic hose 200 is assembled to the apparatus 100 from both with a fixing length of 400 mm from each side (i.e. from the first fixture 1 and the second fixture 2 respectively). The apparatus 100 is set with zero force input applied on the hydraulic hose 200 from the free end (i.e. from second fixture 2 that is rigidly attached to the carriage 13). A desired amount of force F or/and displacement D is provided to the controller 50 to deform the hydraulic hose 200 from free state. The servo actuator 20 applies minimum force F required to deform the hydraulic hose 200 from at every specific time interval defined with a step by step loop function until the desired amount of displacement D or force input F is reached. The controller 50 records the data read from the actuator 20 and the displacement sensor 40 and simultaneously generates force vs displacement diagram GR as the apparatus 100 operates.

LIST OF NUMERALS 1 first fixture
2 second fixture 10 main rack
11 sliding rail
13 carriage
20 actuator
30 load cell
40 displacement sensor
50 controller
100 bend test apparatus
200 hydraulic hose
201 first end of hydraulic hose
202 second end of hydraulic hose
D displacement
F force
GR force vs displacement diagram
L longitudinal direction

The invention claimed is:

1. A bend test apparatus for a hydraulic hose, the apparatus comprising:
 a main rack,
 at least one sliding rail extending in a longitudinal direction and a carriage which is directly joined to the at least one sliding rail and slidable on the at least one sliding rail in the longitudinal direction and which can be displaced by an actuator, wherein the actuator is a linear actuator,
 wherein the apparatus further comprises a first fixture that is rigidly attached to the main rack to retain a first end of the hydraulic hose and a second fixture that is rigidly attached to the carriage to retain a second end of the hydraulic hose, the first fixture being fixed to the main rack and unmovable, the second fixture movable relative to the at least one sliding rail, wherein the carriage and the second fixture are both configured to be displaced toward the first fixture by the linear actuator; and
 wherein the apparatus comprises a load cell that is attached between the carriage and the actuator, the load cell detecting a force applied by the actuator onto the carriage, the force applied to the carriage displacing the carriage in the longitudinal direction and bending the hydraulic hose.

2. The apparatus according to claim 1, further comprising a displacement sensor that is arranged to measure a displacement of the carriage along the sliding rail in the longitudinal direction.

3. The apparatus according to claim 2, further comprising a controller adapted to process the force detected by the load cell and/or the displacement measured by the displacement sensor.

4. The apparatus according to claim 3, wherein the controller is further adapted to control the actuator.

5. The apparatus according to claim 4, wherein the controller is further adapted to iteratively record a dataset comprising at least an instantaneous displacement and a corresponding instantaneous force.

6. The apparatus according to claim 5, wherein the dataset is recorded as a force versus displacement diagram.

7. The apparatus according to claim 1, wherein the linear actuator is a linear servo motor.

8. The apparatus according to claim 1, wherein the at least one sliding rail and the carriage are part of a pulley-belt system that is actuated by the actuator.

9. A bend test apparatus for a hydraulic hose, the apparatus comprising:
 a main rack,
 at least one sliding rail extending in a longitudinal direction and a carriage which is directly joined to the at least one sliding rail and slidable on the at least one sliding rail in the longitudinal direction and which can be displaced by an actuator, wherein the actuator is a linear actuator,
 wherein the apparatus further comprises a first fixture that is rigidly attached to the main rack to retain a first end of the hydraulic hose and a second fixture that is rigidly attached to the carriage to retain a second end of the hydraulic hose, the first fixture being fixed to the main rack and unmovable, the second fixture being movable relative to the at least one sliding rail, and wherein the carriage and the second fixture are both configured to be displaced toward the first fixture by the linear actuator;
 wherein the apparatus comprises a load cell that is attached between the carriage and the actuator, the load cell detecting a force applied by the actuator onto the carriage, the force applied to the carriage displacing the carriage in the longitudinal direction and bending the hydraulic hose;
 wherein the apparatus further comprises a displacement sensor that is arranged to measure a displacement of the carriage along the sliding rail in the longitudinal direction; and
 wherein the apparatus further comprises a controller adapted to process the force detected by the load cell and/or the displacement measured by the displacement sensor, and wherein the controller is configured to signal the actuator to apply a minimum force required to deform the hydraulic hose, the controller and the actuator being configured to adjust the minimum force according to a step by step loop function until a desired amount of displacement or force is reached.

* * * * *